(12) United States Patent
Liu et al.

(10) Patent No.: US 8,713,131 B2
(45) Date of Patent: Apr. 29, 2014

(54) SIMULTANEOUS IMAGE DISTRIBUTION AND ARCHIVING

(75) Inventors: Felix YaikNan Liu, Daly City, CA (US); Zhongming Wu, San Jose, CA (US); Benny Taiklin Wong, Sunnyvale, CA (US); Ron Jeppesen, Missoula, MT (US)

(73) Assignee: RHPiscan Systems, Inc., Torranco, CA (US)

( * ) Notice: Subject to any disclaimer, the term of this patent is extended or adjusted under 35 U.S.C. 154(b) by 422 days.

(21) Appl. No.: 13/032,591

(22) Filed: Feb. 22, 2011

(65) Prior Publication Data

US 2012/0213403 A1 Aug. 23, 2012

Related U.S. Application Data

(60) Provisional application No. 61/307,294, filed on Feb. 23, 2010.

(51) Int. Cl.
*G06F 15/16* (2006.01)

(52) U.S. Cl.
USPC ........................................... 709/217

(58) Field of Classification Search
USPC ........................................... 709/217
See application file for complete search history.

(56) References Cited

U.S. PATENT DOCUMENTS

| | | | |
|---|---|---|---|
| 7,349,525 B2 | 3/2008 | Morton et al. | |
| 7,440,543 B2 | 10/2008 | Morton | |
| 7,505,563 B2 | 3/2009 | Morton et al. | |
| 7,512,215 B2 | 3/2009 | Morton et al. | |
| 7,564,939 B2 | 7/2009 | Morton et al. | |
| 7,664,230 B2 | 2/2010 | Morton et al. | |
| 7,684,538 B2 | 3/2010 | Morton et al. | |
| 7,724,868 B2 | 5/2010 | Morton | |
| 7,876,879 B2 | 1/2011 | Morton | |
| 7,903,789 B2 | 3/2011 | Morton et al. | |
| 7,929,663 B2 | 4/2011 | Morton | |
| 2003/0065950 A1* | 4/2003 | Yarborough | 713/201 |
| 2003/0208654 A1* | 11/2003 | Krontz et al. | 710/312 |
| 2004/0028391 A1* | 2/2004 | Black et al. | 386/108 |
| 2004/0250273 A1* | 12/2004 | Swix et al. | 725/25 |
| 2005/0021680 A1* | 1/2005 | Ekis et al. | 709/219 |
| 2005/0210144 A1* | 9/2005 | Kumagai et al. | 709/229 |
| 2005/0248450 A1* | 11/2005 | Zanovitch | 340/506 |
| 2006/0253888 A1* | 11/2006 | Senga et al. | 725/123 |
| 2006/0291623 A1* | 12/2006 | Smith et al. | 378/69 |
| 2007/0140260 A1* | 6/2007 | Duxbury et al. | 370/395.41 |
| 2008/0267355 A1 | 10/2008 | Morton et al. | |

* cited by examiner

*Primary Examiner* — Christopher Biagini
(74) *Attorney, Agent, or Firm* — Novel IP

(57) ABSTRACT

The present specification discloses a storage system for enabling the substantially concurrent storage and access of data that has three dimensional images processed to identify a presence of a threat item. The system includes a source of data, a temporary storage memory for receiving and temporarily storing the data, a long term storage, and multiple workstations adapted to display three dimensional images. The temporary storage memory is adapted to support multiple file input/output operations executing substantially concurrently, including the receiving of data, transmitting of data to workstations, and transmitting of data to long term storage.

23 Claims, 5 Drawing Sheets

US 8,713,131 B2

SIMULTANEOUS IMAGE DISTRIBUTION AND ARCHIVING

CROSS-REFERENCE TO RELATED APPLICATIONS

The present invention relies on U.S. Provisional Patent No. 61/307,294, entitled "Simultaneous Image Distribution and Archiving" and filed on Feb. 23, 2010, for priority and is herein incorporated by reference in its entirety.

FIELD OF THE INVENTION

The present invention relates to X-ray screening systems. More particularly, the present invention relates to a high speed temporary data storage system that stores high resolution image data and associated detection results.

BACKGROUND OF THE INVENTION

Increases in terrorist threats has created a need to deploy high speed, high resolution, and more accurate threat screening devices in locations which are most likely targets of such violence, such as ports, airports, train stations, and government buildings. Screening technologies currently employed at most places provide either high speed screening but generate digital radiography images which are not fully three-dimensionally (3D) volumetric, or provide relatively detailed 3D volumetric images using computed tomography (CT) at a slow screening speed.

Recently developed screening systems such as the real-time tomography (RTT) screening system developed by Rapiscan Systems, Inc. can screen items such as luggage at a very high rate and produce high-resolution 3D volumetric images. FIG. 1a illustrates the RTT screening system. A piece of luggage 102 is passed through the RTT screening system 100 and a 3D volumetric X-ray image of the luggage 102 is displayed on the monitor 104. FIG. 1b illustrates the 3D volumetric image 105 of the piece of luggage 102 screened by the RTT screening system 100.

The RTT screening system 100 comprises a stationary gantry CT design that controls a plurality of X-ray emitters. It captures 3D images at several times the speed of legacy CT systems. FIG. 2 is a block diagram illustrating high level data flow in the RTT screening system. The RTT screening system 202 comprises a reconstruction engine 204 which receives sinogram data from RTT hardware 202, and produces a high resolution 3D reconstructed image. A threat detection engine 206 receives the reconstructed image as an input from the reconstruction engine 204 and processes it by applying one or more automatic threat detection algorithms to generate a decision, e.g. all clear or signal an alarm, on the image. The threat detection engine 206 then passes on the data comprising the image and the result of processing of the image to a storage device 208, where it is stored temporarily. The same data is retrieved by the 2D and 3D operator workstation(s) 210, 212 and specifically assigned to alarm resolution stations 214 over a network, such as an Ethernet. Regulatory authorities may require high security regions such as airports to store the image data for a predefined period of time, i.e. up to 48 hours. The data is then written to a disk storage system 216 for long term storage, and passed to various display workstations in real-time. U.S. patent application Ser. Nos. 10/554,656, 10/554,975, 10/554,655, 10/554,570, 12/097,422, 12/142,005, and 12/787,878 disclose various aspects of the RTT system and their specifications are incorporated herein by reference in their entirety.

The high-speed RTT system can generate a data rate as high as 400 MB/sec. The data is required to be stored for later retrieval, and also accessed by the 2D and 3D workstations 210, 212 as quickly as possible. Commercially available standard network attached storage (NAS) devices typically store data on an array of hard disk drives. Typically, standard NAS consists of redundant array of inexpensive disks (RAID) to ensure high levels of data integrity. The purpose of the storage array is to store various bag files (.BAG) scanned by the RTT system 202. The storage array also stores engineering/intermediate data such as information associated with the bag images, system calibration information, system configuration, event logs, among other information.

Due to file system overhead and read/write seek time of the hard drive sub-system, among other reasons, standard NAS devices cannot effectively simultaneously store the data at high speed and also provide sustained high-speed read access to multiple screener workstations. Typical hard disk arrays have a seek time of about 15 ms. Therefore, when a standard NAS device tries reading and writing at the same time, the hard drive ends up spending most of the time seeking, thus reducing the effective throughput.

Hence, there is need for a NAS device which provides a high speed temporary storage system that stores high resolution image data and associated detection results. There is also a need for a NAS device that can concurrently or simultaneously store data at high speed and also provide sustained high-speed read access from multiple screener workstations.

SUMMARY OF THE INVENTION

The present specification discloses a storage system for enabling the substantially concurrent storage and access of data, comprising: a source of data, wherein said data comprises a three dimensional image wherein said three dimensional image has been processed to identify a presence of a threat item; a temporary storage memory for receiving and temporarily storing said data, wherein said temporary storage memory is adapted to support multiple file input/output operations executing substantially concurrently and wherein said data is received from said source of data via one of said multiple file input/output operations executing substantially concurrently; at least two workstations for accessing said data, wherein each of said workstations is configured to access the temporary storage memory through one of said multiple file input/output operations executing substantially concurrently; and a long term storage system for accessing and storing said data, wherein said long term storage system is configured to access the temporary storage memory through one of said multiple file input/output operations executing substantially concurrently.

Optionally, the temporary storage memory is configured to receive data from said source of data at a data transfer rate equal to or greater than 1.6 gigabytes per second. The temporary storage memory is a RAM buffer having a size of at least 32 gigabytes. Each of said workstations can access said data at a speed of at least 100 megabytes per second.

Optionally, the temporary storage memory is adapted to receive data from said source of data via a first file input/output operation, transmit data to a first workstation via a second file input/output operation, transmit data to a second workstation via a third file input/output operation, and transmit data to the long term storage via a fourth file input/output operation, wherein each of said first, second, third, and fourth file input/output operations executes concurrently. Each of said file input/output operations is executed via a FTP server thread. The fourth file input/output operation occurs at a rate of at least 200 megabytes per second. The second and third file input/output operations occur at an average rate of at least 70 megabytes per second. Upon receiving a request from a workstation for data that is not present in said temporary storage memory, said temporary storage memory is adapted to retrieve said requested data from the long term storage and transmit the requested data to the workstation.

Optionally, if said data is not associated with an alarm or a threat, the temporary storage memory transmits the data to long term storage and does not retain said data for access by the workstations. The temporary storage memory receives said data into a TCP offload engine. The TCP offload engine receives data from an Ethernet switch. The Ethernet switch is at least a 10 Gb Ethernet switch. The temporary storage memory transmits data to the workstations via an Ethernet switch. The Ethernet switch is at least a 10 Gb Ethernet switch. Each of said workstations is configured to display 3-D images.

In another embodiment, the specification discloses a process for high speed storage and access of data wherein said data comprises a plurality of three dimensional images and wherein said three dimensional images have been processed to identify a presence of a threat item system, comprising: receiving said data into a temporary storage memory through a first file input/output operation; transmitting said data to a first workstation through a second file input/output operation; transmitting said data to a second workstation through a third file input/output operation; and writing said data to a long term storage through a fourth file input/output operation, wherein said first, second, third, and fourth file input/output operations execute substantially concurrently.

Optionally, the temporary storage memory is configured to receive data from a source of said data at a data transfer rate equal to or greater than 1.6 gigabytes per second. The temporary storage memory is a RAM buffer having a size of at least 32 gigabytes. Each of the workstations can access said data at a speed of at least 100 megabytes per second. Each of said file input/output operations is executed via a FTP server thread. The fourth file input/output operation occurs at a rate of at least 200 megabytes per second. The second and third file input/output operations occur at an average rate of at least 70 megabytes per second. Upon receiving a request from a workstation for data that is not present in said temporary storage memory, said temporary storage memory is adapted to retrieve said requested data from the long term storage and transmit the requested data to the workstation. If said data is not associated with an alarm or a threat, the temporary storage memory transmits the data to long term storage and does not retain said data for access by the workstations.

These, and other embodiments, will be described in greater detail in the remainder of this specification.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

Figure 1A:
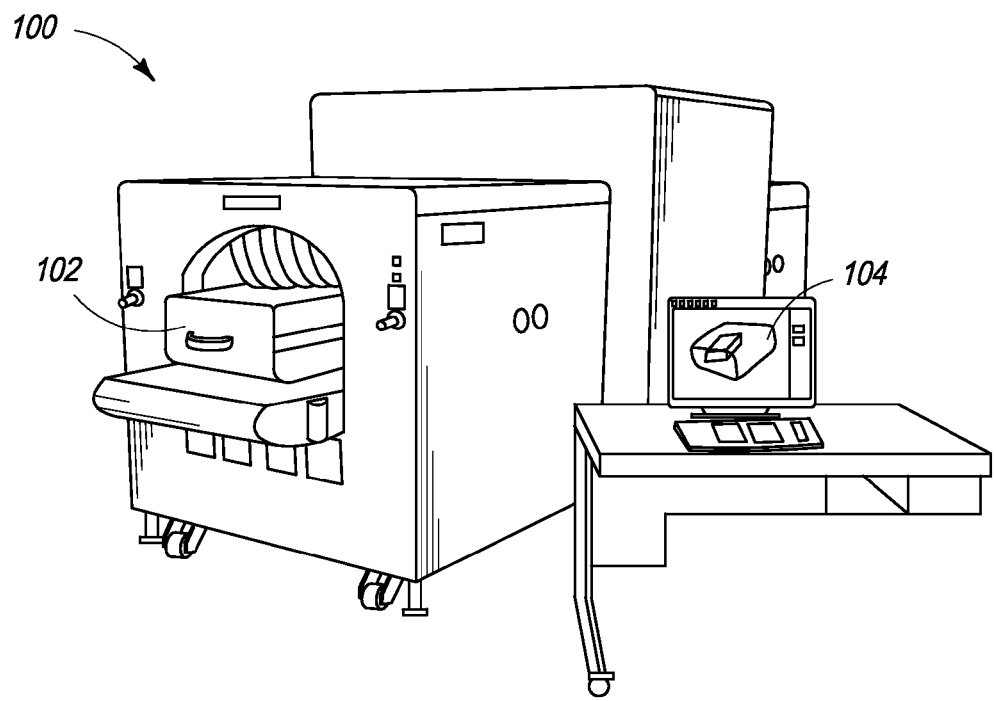
FIG. 1a is a side perspective view of one embodiment of a high speed screening system.

It is an object of the present invention to provide a high speed temporary storage system that stores high resolution image data and associated detection results.

The present specification relates to a high speed temporary storage system that stores high resolution image data and associated detection results. The present specification discloses a hybrid NAS which is used in conjunction with high speed X-ray screening systems and makes use of Random Access Memory (RAM) to cache the screening data. The architecture of the hybrid NAS allows the data to be stored in real time as well as be concurrently or simultaneously accessed by monitoring screener workstations, also in real time.

According to an aspect, the hybrid NAS of the present invention provides random access memory (RAM) to replace the RAID array), thereby eliminating the read/write access time. The hybrid NAS allows random access to the data stored therein, with typical access times of ~15 μs, which is faster than for hard disk storage devices.

The present specification discloses multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention. The present invention will now be discussed in context of embodiments as illustrated in the accompanying drawings.

As a threshold matter, it is important to understand the data rates at issue in the present invention. In one embodiment, a screening system needs to be able to store data generated at a rate of at least 125 MB per second, and concurrently or simultaneously provide access to such generated data to at least two separate, networked workstations at a rate of at least 50 MB per second. One of ordinary skill in the art would appreciate that each workstation comprises a computer having at least one processor, memory, and network access. Preferably, the screening system stores data generated at a rate of at least 250 MB per second, and concurrently or simultaneously provide access to such generated data to at least five separate, networked workstations at a rate of at least 65 MB/s. Preferred write data rates can increase to 300 MB/s, 500 MB/s or greater and preferred read data rates can increase to 75 MB/s or greater depending upon the screening system configuration.

For example, in one embodiment, assuming the image data is produced by a single RTT machine, as described above, and two 3D workstations produce and read the image data simultaneously, three parameters primarily determine the data rate of the RTT system: a) resolution of the reconstruction volume (X, Y and Z), b) belt speed, and c) tunnel size. Shown below are four data rate calculations based upon four different RTT configurations which are as follows:

RTT80 which assumes a 80 cm tunnel size, 250 mm/s belt speed, and 1 mm reconstruction volume resolution;

RTT80 which assumes a 80 cm tunnel size, 500 mm/s belt speed, and 1 mm reconstruction volume resolution;

RTT110 which assumes a 110 cm tunnel size, 250 mm/s belt speed, and 1 mm reconstruction volume resolution; and RTT110 which assumes a having 110 cm tunnel size, 500 mm/s belt speed, and 1 mm reconstruction volume resolution.

TABLE 1

RTT-80 @ 250 mm/sec

| Parameters/Assumptions | Avg/Min | Units |
| --- | --- | --- |
| Belt Speed | 250.000 | mm/sec |
| Size of the bag | 750.000 | Mm |
| Max size of the bag | 2500.000 | Mm |
| Time to acquire the data for Avg Bag | 3.000 | Sec |
| Time to acquire the data for Max Bag | 10.000 | Sec |
| Minimum Gap between bags | 100.000 | Mm |
| Time between bags | 0.400 | Sec |
| Shrink Wrap Performance | 0.700 | |
| Compression performance 3D Vol data & mask | 0.600 | |
| Image resolution tunnel width (X) | 768.000 | Pixel |
| Image resolution tunnel height (Y) | 544.000 | Pixel |
| Size of the 3D projection slice | 835584.000 | Bytes |
| Size of the Mask data | 417792.000 | Bytes |
| .BAG info (Result + Header) | 500000.000 | Bytes/Bag |
| 2D Image size | 15728640.000 | Bytes/Bag |
| Slice resolution | 1.000 | Mm |
| Time to produce 1 mm slice | 0.004 | Sec |
| Decompression time on workstation | 0.001 | s/slice |
| Number of slices for average bag | 750.000 | Slices |
| Number of slices for max bag | 2500.000 | Slices |
| Final Data rate | 125.826 | MB/s |

TABLE 2

RTT-80 @ 500 mm/sec

| Parameters/Assumptions | Avg/Min | Units |
| --- | --- | --- |
| Belt Speed | 500.000 | mm/sec |
| Size of the bag | 750.000 | Mm |
| Max size of the bag | 2500.000 | Mm |
| Time to acquire the data for Avg Bag | 1.500 | Sec |
| Time to acquire the data for Max Bag | 5.000 | Sec |
| Minimum Gap between bags | 100.000 | Mm |
| Time between bags | 0.200 | Sec |
| Shrink Wrap Performance | 0.700 | |
| Compression performance 3D Vol data & mask | 0.600 | |
| Image resolution tunnel width (X) | 768.000 | Pixel |
| Image resolution tunnel height (Y) | 544.000 | Pixel |
| Size of the 3D projection slice | 835584.000 | Bytes |
| Size of the Mask data | 417792.000 | Bytes |
| .BAG info (Result + Header) | 500000.000 | Bytes/Bag |
| 2D Image size | 15728640.000 | Bytes/Bag |
| Slice resolution | 1.000 | Mm |
| Time to produce 1 mm slice | 0.002 | Sec |
| Decompression time on workstation | 0.001 | s/slice |
| Number of slices for average bag | 750.000 | Slices |
| Number of slices for max bag | 2500.000 | Slices |
| Final Data rate | 251.651 | MB/s |

TABLE 3

RTT-110 @ 250 mm/sec

| Parameters/Assumptions | Avg/Min | Units |
| --- | --- | --- |
| Belt Speed | 250.000 | mm/sec |
| Size of the bag | 750.000 | Mm |
| Max size of the bag | 2500.000 | Mm |
| Time to acquire the data for Avg Bag | 3.000 | Sec |
| Time to acquire the data for Max Bag | 10.000 | Sec |
| Minimum Gap between bags | 100.000 | Mm |
| Time between bags | 0.400 | Sec |
| Shrink Wrap Performance | 0.700 | |
| Compression performance 3D Vol data & mask | 0.600 | |
| Image resolution tunnel width (X) | 1024.000 | Pixel |
| Image resolution tunnel height (Y) | 768.000 | Pixel |
| Size of the 3D projection slice | 1572864.000 | Bytes |
| Size of the Mask data | 786432.000 | Bytes |
| .BAG info (Result + Header) | 500000.000 | Bytes/Bag |
| 2D Image size | 15728640.000 | Bytes/Bag |
| Slice resolution | 1.000 | Mm |
| Time to produce 1 mm slice | 0.004 | Sec |
| Decompression time on workstation | 0.001 | s/slice |
| Number of slices for average bag | 750.000 | Slices |
| Number of slices for max bag | 2500.000 | Slices |
| Final Data rate | 236.568 | MB/s |

TABLE 4

RTT-110 @ 500 mm/sec

| Parameters/Assumptions | Avg/Min | Units |
| --- | --- | --- |
| Belt Speed | 500.000 | mm/sec |
| Size of the bag | 750.000 | Mm |
| Max size of the bag | 2500.000 | Mm |
| Time to acquire the data for Avg Bag | 1.500 | Sec |
| Time to acquire the data for Max Bag | 5.000 | Sec |
| Minimum Gap between bags | 100.000 | Mm |
| Time between bags | 0.200 | Sec |
| Shrink Wrap Performance | 0.700 | |
| Compression performance 3D Vol data & mask | 0.600 | |
| Image resolution tunnel width (X) | 1024.000 | Pixel |
| Image resolution tunnel height (Y) | 768.000 | Pixel |
| Size of the 3D projection slice | 1572864.000 | Bytes |
| Size of the Mask data | 786432.000 | Bytes |
| .BAG info (Result + Header) | 500000.000 | Bytes/Bag |
| 2D Image size | 15728640.000 | Bytes/Bag |
| Slice resolution | 1.000 | Mm |
| Time to produce 1 mm slice | 0.002 | Sec |
| Decompression time on workstation | 0.001 | s/slice |
| Number of slices for average bag | 750.000 | Slices |
| Number of slices for max bag | 2500.000 | Slices |
| Final Data rate | 473.136 | MB/s |

One of ordinary skill in the art would appreciate how to calculate the final data rate from the parameters shown above. The results provided in Tables 1 through 4 demonstrate that a NAS system being used in conjunction with the RTT system requires data storage, or write speed, in excess of 100 MB/s, preferably in excess of 230 MB/s, and more preferably in excess of 475 MB/s, while the same data is concurrently or simultaneously being accessed by the 2D/3D workstations.

The hybrid NAS of the present invention provides random access memory (RAM) to replace the RAID array, thereby eliminating the read/write access time. The hybrid NAS allows random access to the data stored therein, with typical access times of ~15 μs, which is faster than for hard disk storage devices. The high-speed image data stored in the hybrid NAS can then be streamed from the corresponding RAM to a standard NAS system for long-term storage, while the same data can be accessed by the 2D and 3D workstations with minimal delay. Another advantage of the hybrid NAS is that the data can be accessed by multiple clients at the same time. Reading and writing at the same time does not affect the performance of random access memory of the hybrid NAS. The size of the RAM file system of the hybrid NAS can be chosen such that it can store data for a predetermined amount of time at full data rate. In an exemplary embodiment, a hybrid NAS can be configured to store up to 30 minutes of data, at full speed.

Figure 1B:
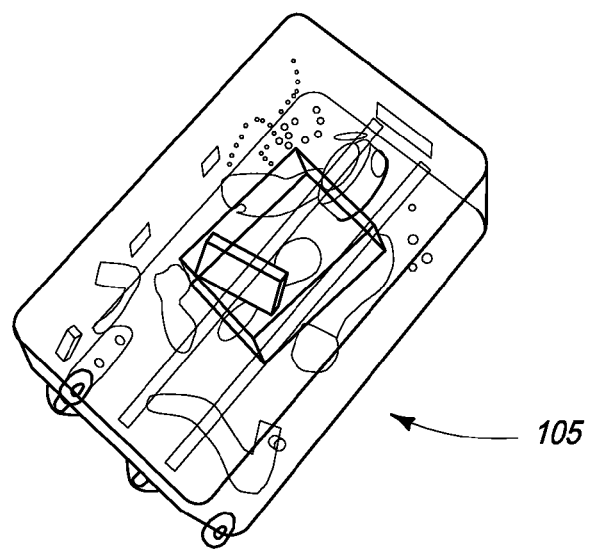
FIG. 1b is a 3D volumetric image of a piece of luggage screened by a high speed screening system.
Figure 2:
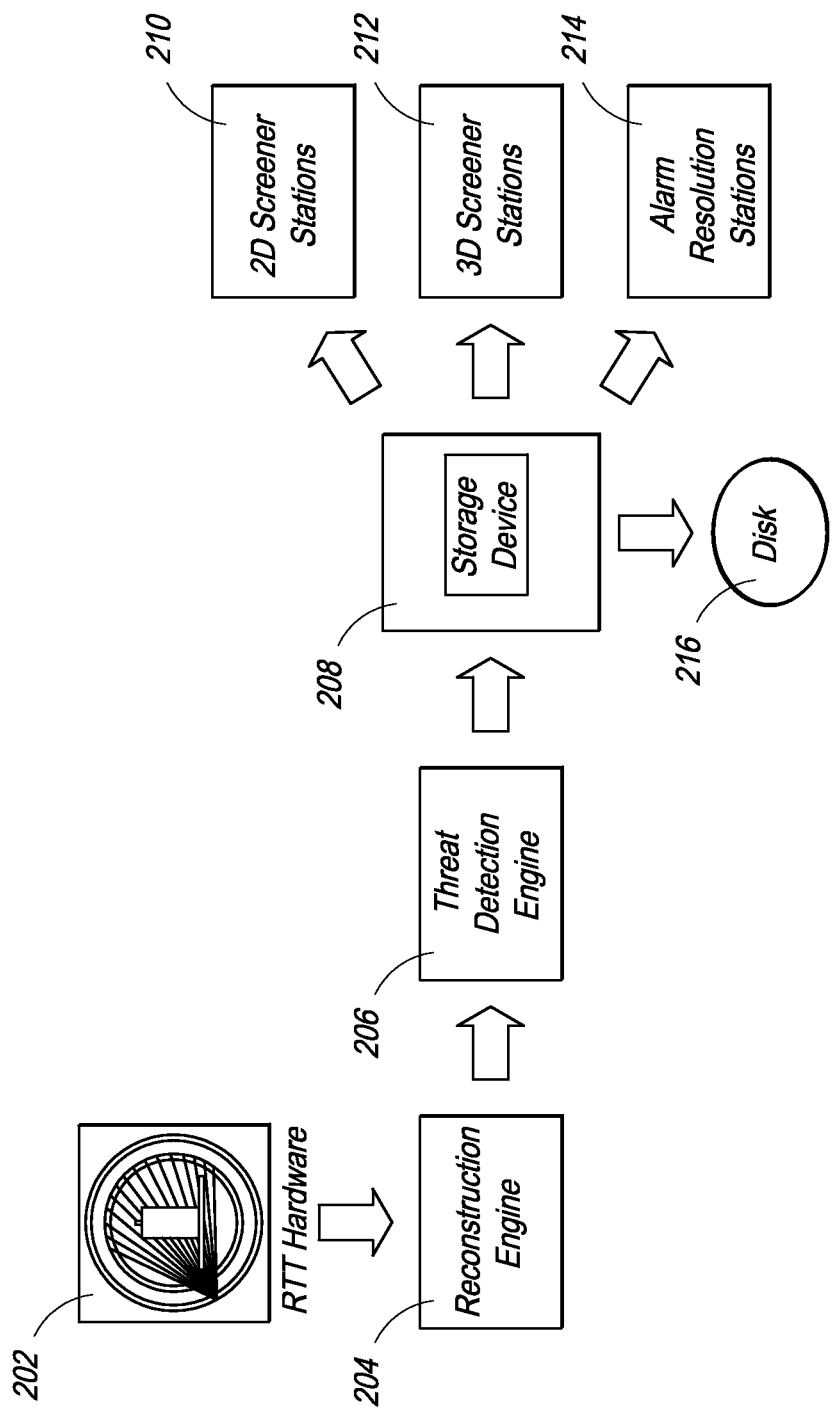
FIG. 2 is a block diagram illustrating high level data flow in one embodiment of a high speed screening system.

In one embodiment, the high speed temporary storage system provided by the present invention is a hybrid NAS device, which is used in conjunction with a RTT screening system developed by Rapiscan Systems, Inc. as illustrated in FIGS. 1 and 2. It should be appreciated that the hybrid NAS system can be implemented using standard hardware computing devices and operating system software, such as a 64-bit Linux Operating System.

Figure 3:
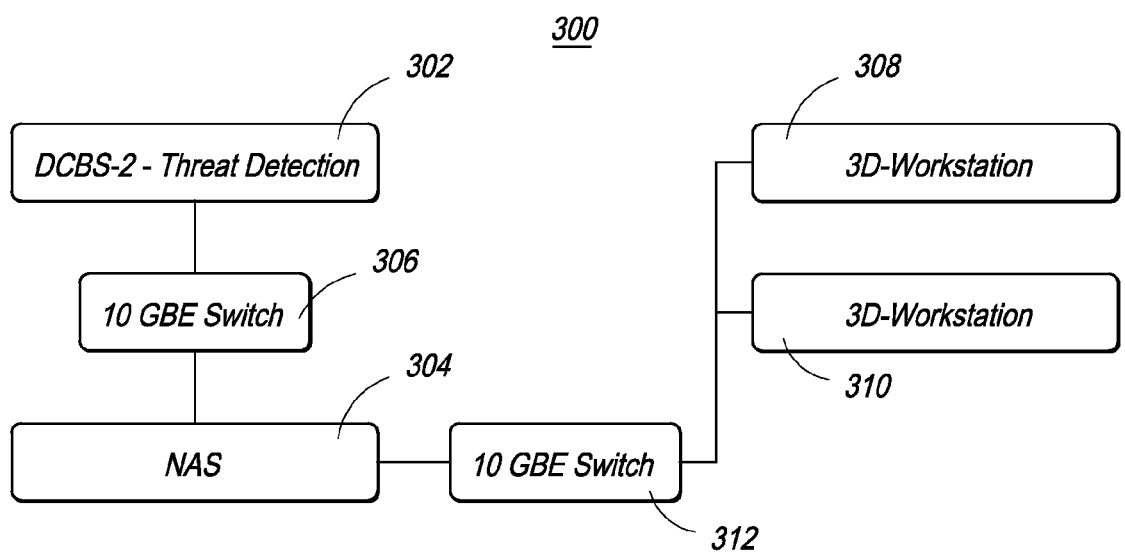
FIG. 3 is a block diagram illustrating an exemplary data flow architecture in a screening system.

FIG. 3 illustrates an exemplary architecture 300 of data flows in an exemplary high speed screening system. It should be appreciated that the devices types, to the extent specific devices are noted, are exemplary and do not limit the nature or scope of the present invention. The system architecture 300 utilizes three dual cell blade systems (DCBS) as the hardware for the threat detection engine 302. Data generated by the threat detection engine 302 is written to a hybrid NAS 304 via at least a 10 Gb Ethernet switch 306, or higher, and is simultaneously retrieved by 2D and 3D workstations 308, 310 over 10 Gb Ethernet switch 312, or higher. In an embodiment, the system 300 may also comprise an Ethernet controller, separate from or integrated within the servers comprising the NAS 304. It should be appreciated that the embodiments described above are intended to provide hardware examples and not intended to be limiting. In particular, the system architecture 300 may include any hardware or software that performs the equivalent functionality as the three DCBS systems 302 and Ethernet switches 306, 312.

Figure 4:
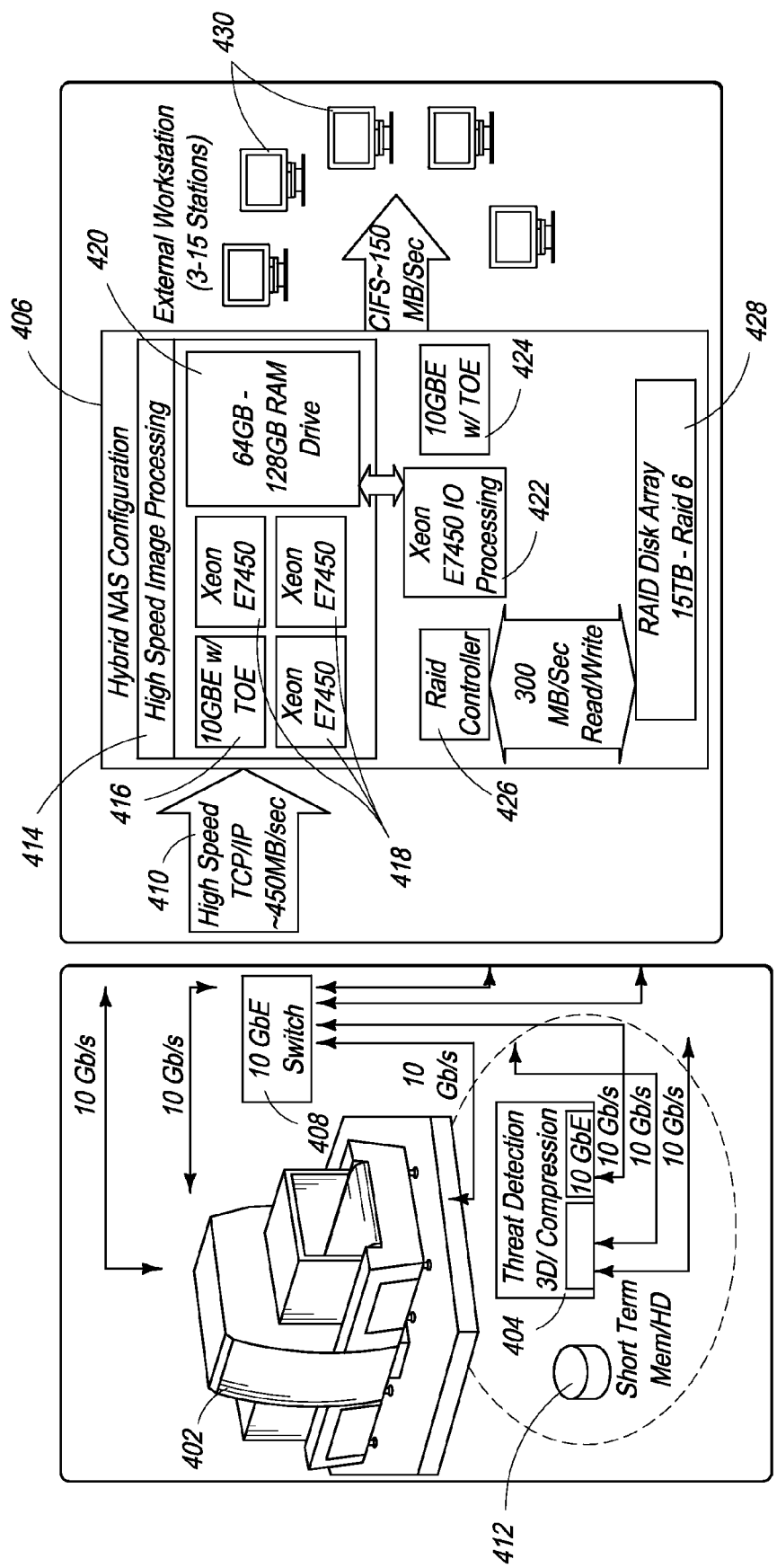
FIG. 4 is a block diagram of one embodiment of a high-speed screening system employing a hybrid NAS configuration, in accordance with one embodiment of the present invention.

FIG. 4 illustrates a block diagram of the screening system illustrated in FIG. 3 employing a hybrid NAS configuration. Screening system 402 comprises a reconstruction engine which receives sinogram data, or X-ray sensor data, from its RTT scanning unit, and produces a high resolution 3D reconstructed image. A threat detection engine 404 receives the reconstructed image as an input and processes it by applying one or more detection algorithms to produce a decision as to whether to clear the bag (e.g. provide an okay indication or not activate any alarm) or indicate that the bag should be manually checked or checked again using the same or different screening device (e.g. an alarm). The data generated by the threat detection engine 404, which comprises three dimensional image data that has been processed to identify a threat item, is transferred to hybrid NAS 406 via one or more switches 408, such as a 10 GbE Ethernet switch, and a high speed network connection 410, such as a TCP/IP connection. In one embodiment, data from the threat detection engine 404 may be temporarily stored in a short term memory 412, such as DDR2, DDR3, SDRAM, or any type of random access memory (RAM), and more preferably, in short term memory that provides transfer data rates greater than 1.6 GB/s, such as, but not limited to, 3.2 GB/s, 6.4 GB/s, or 12.8 GB/s. Short term memory can be a temporary buffer that stores up to the last "n" minutes of data from the system, where "n" may be defined by a user of the system to be 24 hours or down to a few minutes, or any increment therein.

The hybrid NAS 406 comprises a high speed image processing unit 414 comprising a TCP offload engine (TOE) 416 to rapidly move substantial amounts of data to multiple places, one or more processors 418, and a RAM drive 420. The TOE 416 is a technology used in network interface cards to offload processing of the entire TCP/IP stack to the network controller and is known to persons of ordinary skill in the art. It is primarily used with high speed interfaces like 10 GbE, where processing overhead (CPU time) of the network stack becomes significant. The one or more processors 418 process the data from the threat detection engine being stored in the RAM drive 420. In one embodiment the high speed image processing unit comprises 64 GB to 128 GB of RAM.

The hybrid NAS 406 further comprises an input/output (I/O) processor 422, a TOE 424, and a RAID controller 426 which controls read/write into RAID disk array 428. In one embodiment, the I/O processor 422 operates at 2.4 GHz or higher and processes the data being written to and being read out of the RAID disk array 428. The RAID controller 426 controls the read/write operations into the RAID disk array 428. The data stored using the hybrid NAS 406 is made available to a plurality of external workstations 430, at a high speed of at least 100 MB/sec and more preferably 125 MB/s, 250 MB/s, 350 MB/s, 400 MB/s, 500 MB/s or greater than 500 MB/s In one embodiment the number of external workstations accessing the data stored in the hybrid NAS 406 ranges from 3 to 15.

Figure 5:
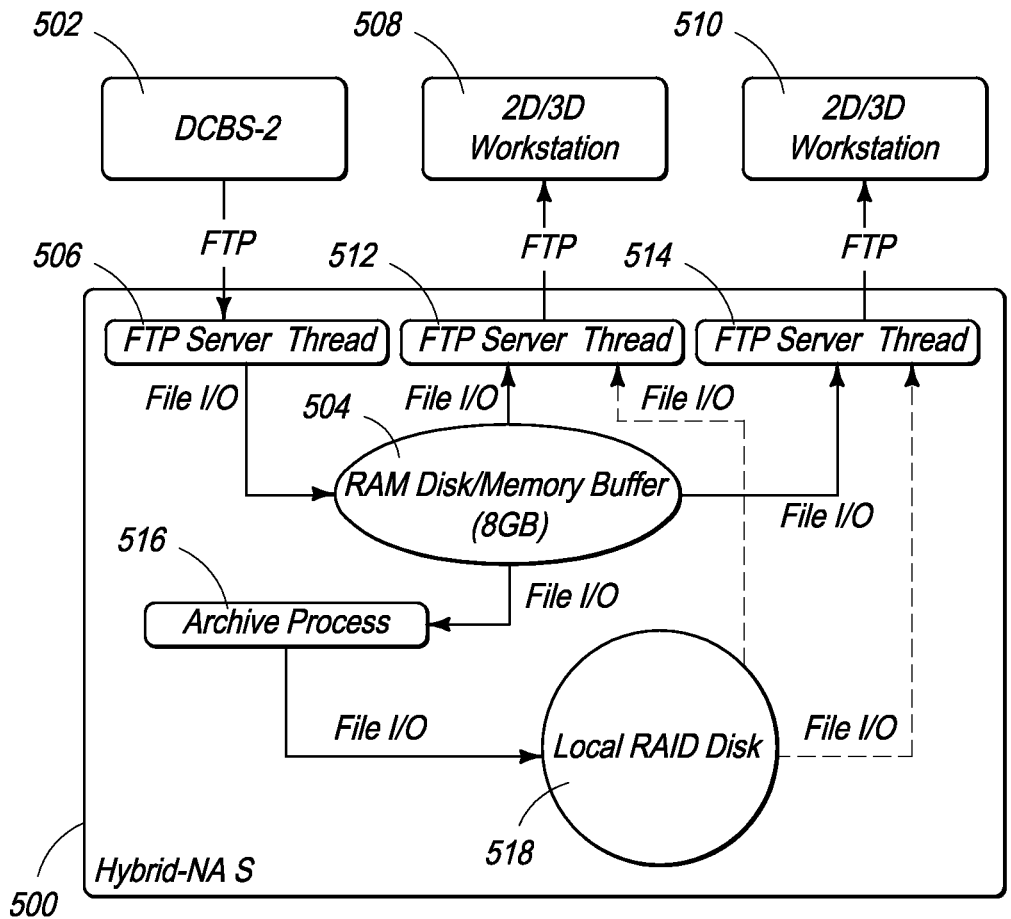
FIG. 5 is a block diagram of the hybrid NAS, in accordance with one embodiment of the present invention.

FIG. 5 illustrates a software block diagram of the hybrid NAS 500, in accordance with one embodiment of the present invention. The figure illustrates a DCBS module 502 (running on a processor) accessing random access memory (RAM) buffer 504 by means of file transfer protocol (FTP) via a FTP server thread 506 using a file input-output (I/O) operation. The RAM buffer 504 is also accessed by 2D and 3D workstations 508, 510 by means of FTP via FTP server threads 512 and 514 respectively, using file I/O operations. An archiving process 516 accesses the RAM buffer 504 periodically, using file I/O operation and writes data stored on the RAM buffer 504 on a permanent storage device such as a RAID disk array 518. The archiving process is any programmed process for reading data from memory and writing the data to storage. In one embodiment, the archiving process has continuous access to RAM and the access rate is controlled using an operating system task priority setting.

In the embodiment illustrated in FIG. 5, the RAM buffer 504 is accessed by four different threads, i.e. an interface to DCBS 502 for storing real time RTT data comprising image data in the form of files with .BAG extensions, two 2D/3D workstations 508, 510 for viewing the .BAG images, and a local archiving process 516 running on a local server to perform sequential writes to the local RAID disks 518, hard disks, or any other form of long term storage. Long term storage may be configurable per a user's requirements. In a typical airport installation, a user may require to store all processed images up to 48 hours. The data are usually stored in RAID, NAS, or SANs. In the embodiment illustrated in FIG. 5, FTP servers, which are used purely for illustrative purposes, enable multiple workstations to establish concurrent sessions, or instances. In other embodiments, various suitable data transfer protocols which enable the establishment of concurrent instances of data among multiple workstations may be used. It should be appreciated that each workstation comprises a client device, such as a desktop, laptop, mobile device, tablet computer, or other computer with a network connection and interface, a processor, a display, and programmatic applications collectively configured to receive and display three dimensional data.

If a 3D workstation 508 tries to access a file that is not cached in the RAM buffer 504, the archiving process 516 reads the required data from the RAID disk array 518 and transmits the data. In an embodiment, under this condition, the performance of the write task slows down, but the hybrid configuration continues cache to the RAM buffer 504. The frequency of this condition depends on the size of the RAM buffer 504, which in various embodiments, ranges from 32 GB to 64 GB and caches approximately 50 to 100 .BAG image files.

In one embodiment, the hybrid NAS 500 illustrated in FIG. 5 is designed to perform intelligent caching. For example, the hybrid NAS 500 can be configured to store only the images associated with an alarm, thereby reducing the amount of memory required. The images which are not associated with an alarm (i.e. cleared) are stored on the RAID disks 518 and removed from the RAM buffer 504 as soon as possible or based on a predefined period of time, such as after "n" minutes have elapsed, or based on a predefined of RAM buffer usage, such as after "X" megabytes of data are stored or after "X %" of the RAM buffer is occupied. One of ordinary skill in the art would appreciate that the "alarm" is generated by the security scanning system, using systems and methods known to persons of ordinary skill in the art. A processor with the security scanning system records to memory an alarm with a specific file, thereby activating the long term storage process, as described above, along with the RAM-based delivery of the file information to workstations. Other screening characteristics could also be used, including bag size, bag contents, passenger destination (using, for example, the system disclosed in U.S. Pat. No. 7,418,077, which is incorporated herein by reference).

Tables 5A and 5B illustrate the performances of a standard NAS and a hybrid NAS respectively, when operated in conjunction with the RTT screening system under identical conditions.

TABLE 5A

| Configuration | Average Write Speed (MB/s) | Average Read Speed (MB/s) |
| --- | --- | --- |
| 1 RTT (Write only) | 202.2 | |
| 1 RTT/1 3D Workstation | 100.1 | 68 |
| 1 RTT/2 3D Workstation | 13 | 63.7 |

The results depicted in Table 5A show that the standard NAS was able to sustain approximately 202 MB/s during the write only (1 RTT) cycle. However, the performance of the standard NAS dropped once there is a simultaneous read cycle.

TABLE 5B

| Configuration | Average Write Speed (MB/s) | Average Read Speed (MB/s) |
| --- | --- | --- |
| 1 RTT (Write only) | 236.7 | |
| 1 RTT/1 3D Workstation | 222.3 | 107.93 |
| 1 RTT/2 3D Workstation | 226 | 76.5 |

The results depicted in Table 5B show the performance of the hybrid NAS. The system as configured was able to sustain approximately 226 MB/sec while allowing two 3D workstations to access the data at the rate of 75 MB/sec. As is apparent by the results illustrated in Tables 5A and Table 5B, the hybrid NAS configuration can achieve relatively high read/write rate required by a high data rate security system.

The hybrid NAS can be applied to various X-ray screening systems existing in the art including all of the Rapiscan Systems, Inc. security products. The use of the hybrid NAS with the RTT system is only for illustrative purposes and should not be construed as limiting. While the exemplary embodiments of the present invention are described and illustrated herein, it will be appreciated that they are merely illustrative. It will be understood by those skilled in the art that various changes in form and detail may be made therein without departing from or offending the spirit and scope of the appended claims.

We claim:

1. A storage system for enabling the substantially concurrent storage and access of data, comprising:
   a. A source of data, wherein said data comprises a three dimensional image wherein said three dimensional image has been processed to identify a presence of a threat item;
   b. A random access memory for receiving and temporarily storing said data, wherein said random access memory is adapted to at least four file input/output operations executing substantially concurrently and wherein said data is received from said source of data via one of said at least four file input/output operations executing substantially concurrently;
   c. At least two workstations for accessing said data, wherein each of said workstations is configured to access the random access memory through one of said at least four file input/output operations executing substantially concurrently; and
   d. A long term storage system for accessing and storing said data, wherein said long term storage system is configured to access the random access memory through one of said at least four file input/output operations executing substantially concurrently, wherein, if said data is not associated with an alarm or a threat, the random access memory transmits the data to long term storage and does not retain said data for access by the workstations.

2. The storage system of claim 1 wherein said random access memory is configured to receive data from said source of data at a data transfer rate equal to or greater than 1.6 gigabytes per second.

3. The storage system of claim 1 wherein said random access memory has a size of at least 32 gigabytes.

4. The storage system of claim 1 wherein each of said workstations can access said data at a speed of at least 100 megabytes per second.

5. The storage system of claim 1 wherein said random access memory is adapted to receive data from said source of data via a first file input/output operation, transmit data to a first workstation via a second file input/output operation, transmit data to a second workstation via a third file input/output operation, and transmit data to the long term storage via a fourth file input/output operation, wherein each of said first, second, third, and fourth file input/output operations executes concurrently.

6. The storage system of claim 5 wherein each of said file input/output operations is executed via a FTP server thread.

7. The storage system of claim 5 wherein said fourth file input/output operation occurs at a rate of at least 200 megabytes per second.

8. The storage system of claim 7 wherein said second and third file input/output operations occur at an average rate of at least 70 megabytes per second.

9. The storage system of claim 1 wherein, upon receiving a request from a workstation for data that is not present in said random access memory, said random access memory is adapted to retrieve said requested data from the long term storage and transmit the requested data to the workstation.

10. The storage system of claim 1 wherein said random access memory receives said data into a TCP offload engine.

11. The storage system of claim 10 wherein said TCP offload engine receives data from an Ethernet switch.

12. The storage system of claim 11 wherein said Ethernet switch is at least a 10 Gb Ethernet switch.

13. The storage system of claim 1 wherein said random access memory transmits data to the workstations via an Ethernet switch.

14. The storage system of claim 13 wherein said Ethernet switch is at least a 10 Gb Ethernet switch.

15. The storage system of claim 1 wherein each of said workstations is configured to display 3-D images.

16. A process for high speed storage and access of data wherein said data comprises a plurality of three dimensional images and wherein said three dimensional images have been processed to identify a presence of a threat item system, comprising:
   a. Receiving said data into a random access memory through a first file input/output operation;
   b. Transmitting said data to a first workstation through a second file input/output operation;
   c. Transmitting said data to a second workstation through a third file input/output operation; and
   d. Writing said data to a long term storage through a fourth file input/output operation, wherein said first, second, third, and fourth file input/output operations execute substantially concurrently and wherein, if said data is not associated with an alarm or a threat, the random access memory transmits the data to long term storage and does not retain said data for access by the workstations.

17. The process of claim 16 wherein said random access memory is configured to receive data from a source of said data at a data transfer rate equal to or greater than 1.6 gigabytes per second.

18. The process of claim 16 wherein said random access memory is a RAM buffer having a size of at least 32 gigabytes.

19. The process of claim 16 wherein each of said workstations can access said data at a speed of at least 100 megabytes per second.

20. The process of claim 16 wherein each of said file input/output operations is executed via a FTP server thread.

21. The process of claim 16 wherein said fourth file input/output operation occurs at a rate of at least 200 megabytes per second.

22. The process of claim 21 wherein said second and third file input/output operations occur at an average rate of at least 70 megabytes per second.

23. The process of claim 16 wherein, upon receiving a request from a workstation for data that is not present in said random access memory, said random access memory is adapted to retrieve said requested data from the long term storage and transmit the requested data to the workstation.

* * * * *

UNITED STATES PATENT AND TRADEMARK OFFICE
CERTIFICATE OF CORRECTION

PATENT NO. : 8,713,131 B2  
APPLICATION NO. : 13/032591  
DATED : April 29, 2014  
INVENTOR(S) : Felix YaikNan Liu et al.

Page 1 of 1

It is certified that error appears in the above-identified patent and that said Letters Patent is hereby corrected as shown below:

On the Title Page  
Item (73) the Assignee Name is listed as "RHPiscan Systems, Inc." and should be listed as "Rapiscan Systems, Inc".

Signed and Sealed this  
Twenty-sixth Day of August, 2014

Michelle K. Lee  
*Deputy Director of the United States Patent and Trademark Office*